Jan. 9, 1940.   W. R. FREEMAN   2,186,332
BRAKING MECHANISM
Filed Feb. 15, 1933   2 Sheets-Sheet 1

Inventor
Walter R. Freeman
By E. E. Huffman
Att'y.

Jan. 9, 1940.  W. R. FREEMAN  2,186,332
BRAKING MECHANISM
Filed Feb. 15, 1933   2 Sheets-Sheet 2

Inventor
Walter R. Freeman
By
Att'y.

Patented Jan. 9, 1940

2,186,332

UNITED STATES PATENT OFFICE 2,186,332

BRAKING MECHANISM

Walter R. Freeman, University City, Mo., assignor to Wagner Electric Corporation, St. Louis, Mo., a corporation of Delaware Application February 15, 1933, Serial No. 656,777

5 Claims. (Cl. 192—13)

My invention relates to braking mechanism and more particularly to power-operated brakes which are manually controlled.

One of the objects of my invention is to provide a manually controlled power-operated braking system with means for preventing the release of the brakes from applied position notwithstanding the manual control has been placed in a position to permit release of the brakes, whereby the operator may, without the use of the manual control, maintain the brakes applied and prevent the vehicle from rolling backward or forward after it has been stopped on an incline.

A further object of my invention is to provide the braking system with means for predetermining the amount of pressure with which the brakes will be held in applied position when the release preventing means is operated and the manual control is in release permitting position.

A more specific object of my invention is to provide the exhaust port of a control valve for a power-operated braking system with an independently operable shut-off valve under the control of the clutch mechanism.

Other objects of my invention will become apparent from the following description taken in connection with the accompanying drawings showing a single embodiment thereof.

Figure 1:
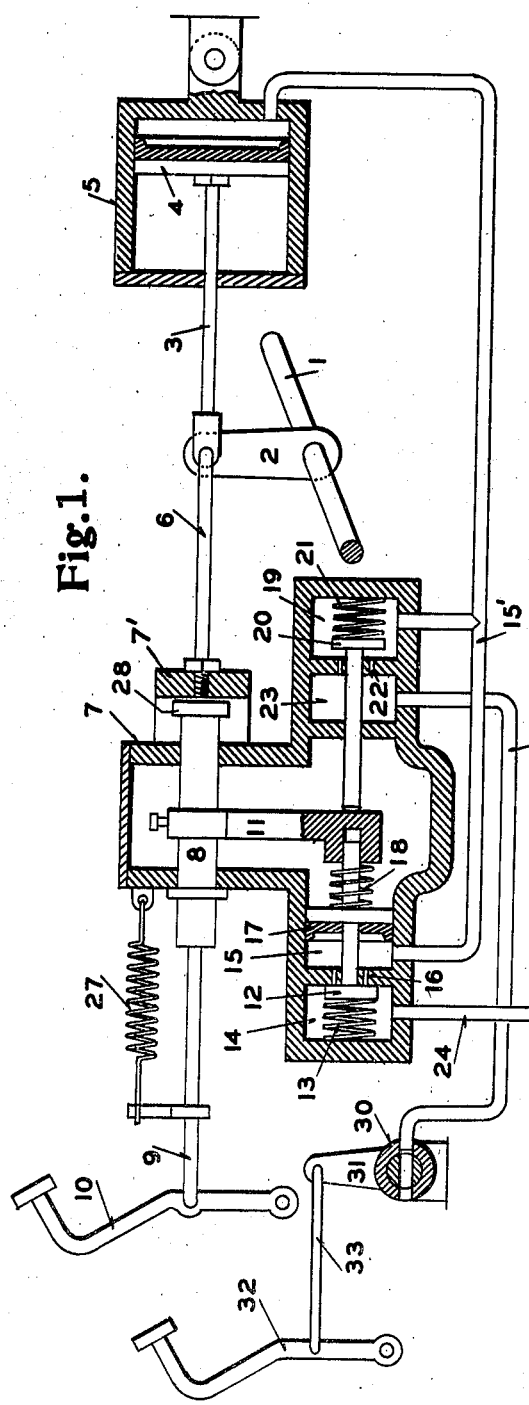
Figure 2:
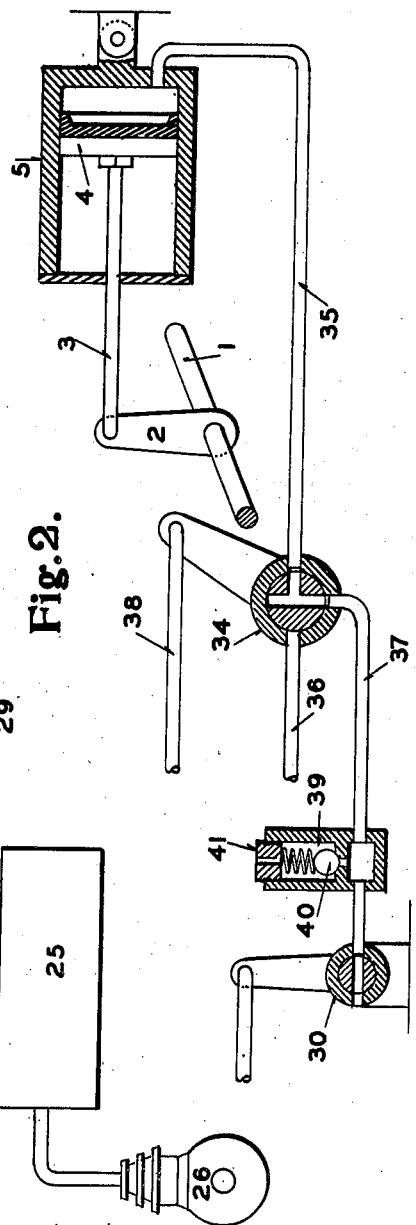
Figure 3:
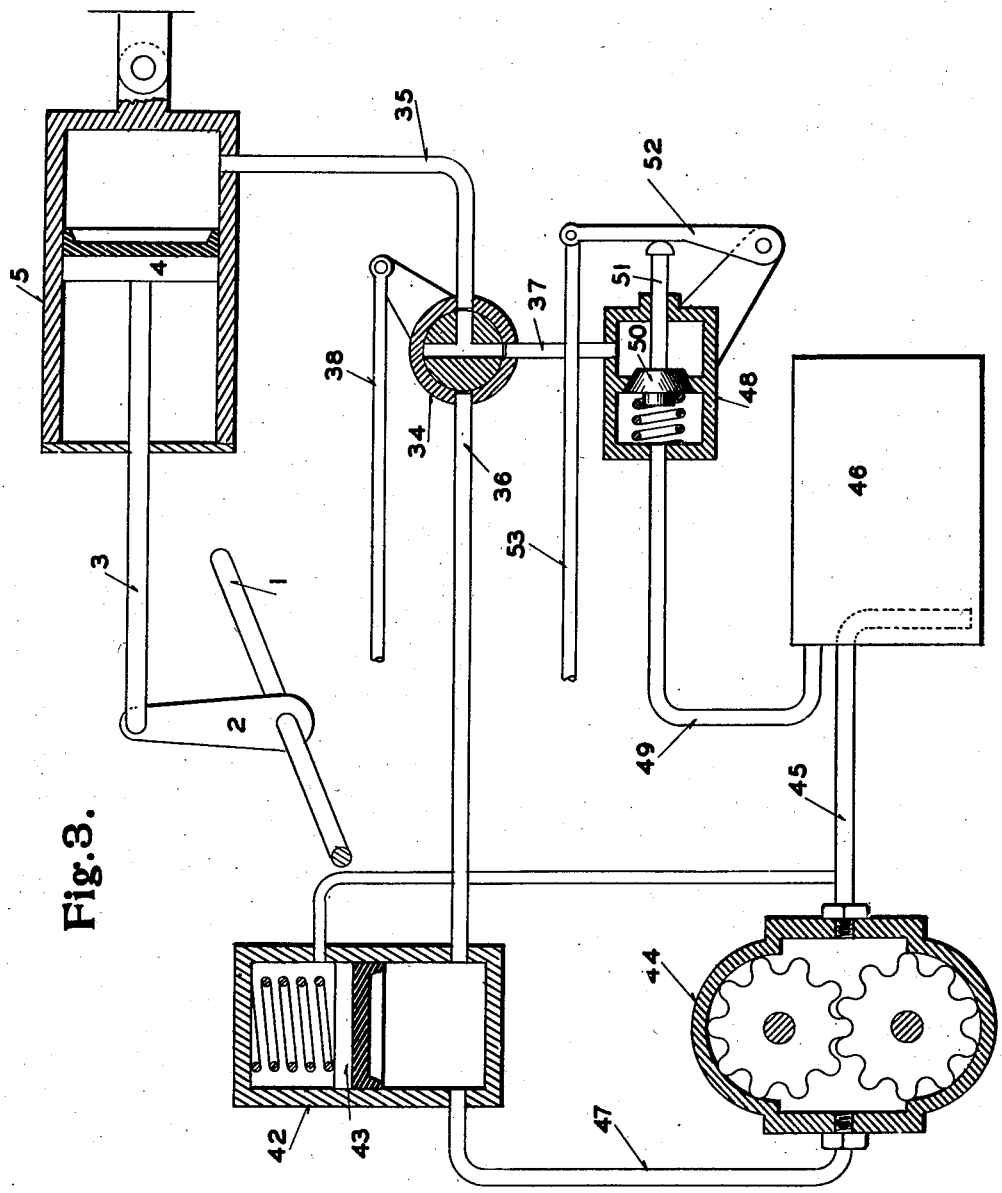

In the drawings Figure 1 is a schematic view of a manually-controlled power-operated braking system of the air pressure type embodying my novel means for preventing release of the brakes from applied position; Figure 2 is a simplified schematic view of the means for predetermining the amount of pressure with which the brakes will be held in applied position; and Figure 3 is a schematic view of a power brake system of the liquid pressure type showing my invention embodied therein.

For purposes of illustration, I have disclosed my invention as being applied to power-operated braking systems of the air or liquid pressure type having a combined "follow-up and metering" control valve, or a common 3-way valve, but it is to be understood that it may be equally well applied to other types of power-operated braking systems having other types of control valves.

Referring to Figure 1 in detail, the numeral 1 indicates the usual cross shaft of a motor vehicle which is adapted to actuate the wheel braking mechanism. The shaft 1 is provided with an actuating arm 2 which is connected, by means of a rod 3, with the piston 4 of a power cylinder 5, the latter member being pivoted to a stationary part of the vehicle chassis. The arm 2 also has pivoted thereto a rod 6 which is secured to a valve casing 7 by means of the casing bracket 7'. This valve casing contains a combined "follow-up and metering valve" for controlling the application and exhaust of air under pressure to the cylinder 5. Slidably mounted in the valve casing is a rod 8 in alignment with the rod 6, this rod 8 being connected, by means of a rod 9, with the brake pedal 10. It is thus seen that the valve casing 7 is supported in a suspended position on the rods 6 and 8 which are permitted to have relative movement for controlling the valves within the casing. The rod 8 has secured thereto an arm 11 for controlling the two valves within the casing.

The application valve 12 is normally biased to the closed position by spring 13 in the application chamber 14. This application chamber is in communication with a second chamber 15 by means of openings 16 controlled by the valve 12. The stem of the valve 12 extends within the chamber 15 and is provided with a piston 17 in fluid-tight relation with the walls of the chamber. A second spring 18 is interposed between the valve stem and the actuating arm 11.

The chamber 15 is connected by a fluid conduit 15' with the power cylinder 5 and is also in communication with the exhaust chamber 19 located on the opposite side of the arm 11. The exhaust chamber 19 is provided with an exhaust valve 20 normally biased to its closed position by means of the spring 21, the exhaust valve controlling the openings 22 leading to the atmosphere through chamber 23. The exhaust valve 20 is provided with a stem extending to a point adjacent the arm 11.

The application chamber 14 is connected, by a conduit 24, to a suitable source of power which, in this instance, comprises a pressure tank 25 and an air compressor 26. This air compressor is shown as a separate unit but may be driven directly by the vehicle engine or by a suitable suction motor operated from the intake manifold of the engine.

In operation of the above described braking system, the exhaust 20 is normally held in open position by the arm 11 when the brake pedal 10 is in its inoperative position, this condition being the result of spring 27, between the valve casing and rod 9, normally biasing the rod 8 and its attached arm 11 to its extreme right position. Upon actuation of the brake pedal 10 to apply the brakes, the rod 8 is moved relatively to the valve casing, permitting the exhaust valve 20 to close and causing the arm 11 to compress spring 18 and force the application valve 12 to open position, thereby admitting fluid under pressure from the pressure tank 25 to the power cylinder 5 and causing the piston 4 to be moved to the left to rotate the cross shaft 1 and apply pressure to the brakes. The movement of the arm 2, by means of the power piston 4 and connecting rod 6, will cause the valve casing to follow-up the movement of the rod 8, thus permitting the application valve 12 to close, the exhaust valve 20 remaining closed. Further movement of the brake pedal 10 will again open the application valve and admit additional air under pressure to the power cylinder to apply further pressure to the brakes with the same follow-up action of the valve casing.

When the brake pedal 10 is released, spring 27 will cause the rod 8 to be moved relatively to the valve casing and open the exhaust valve 20 to release the air in the power cylinder 5, said valve remaining open until it is desired to again apply the brakes.

The piston 17 in chamber 15 prevents an excess of air under pressure from entering the power cylinder when the application valve is open since the pressure in the chamber 15 will cause the piston to move to the right against the action of the spring 18, thereby closing the valve 12. In case of failure of the power system, the rod 8 is provided with a shoulder 28 whereby the shaft 1 may be actuated directly by means of the brake pedal.

In accordance with my invention I provide the exhaust chamber 19 with a conduit 29 which is connected to a shut-off valve 30, the rotatable element of which is provided with an arm 31 for connection with the clutch pedal 32 by means of rod 33. The shut-off valve is in open position when the clutch pedal is in the engaged position of the clutch. With this structure, when the clutch pedal is moved to disengage the clutch, the shut-off valve 30 will be closed, and if the brakes have been applied, they may be maintained in applied position without maintaining the brake pedal in applied position for, although the exhaust valve 20 will be open, the power cylinder is prevented from exhausting to the atmosphere by means of the shut-off valve. If the clutch pedal has been moved to a position to disengage the clutch mechanism prior to the application of the brakes, the brakes may be applied by moving the brake pedal in the usual manner and they will be held in applied position without maintaining pressure on the brake pedal.

My invention has been found to be very useful in the operation of vehicles provided with power-operated brakes for, through its use, the operator may prevent his brakes from being released from applied position without the necessity of maintaining his foot upon the brake pedal, thus enabling him to use his right foot to manipulate other mechanism, such, for example, as the accelerator. An example of its use is in starting the vehicle on an incline as the operator need only manipulate the clutch and accelerator pedals to start the vehicle without danger of the vehicle rolling backward, as would be the case if the operator were required to hold the vehicle from rolling backward by maintaining his right foot on the brake pedal.

Referring to Figure 2, I have shown a simplified power system in which the combined "follow-up and metering valve" shown in Figure 1 has been replaced by a simple 3-way valve of common construction. The purpose of this figure is to disclose means whereby only a predetermined braking pressure will be maintained in the power cylinder when the shut-off valve is in closed position.

One of the ports of the 3-way valve 34 is connected, by conduit 35, with the power cylinder 5 for actuating the cross shaft 1. Another of the ports of the 3-way valve is connected, by means of a conduit 36, with a source of pressure as, for example, the pressure tank shown in Figure 1. The remaining port is connected to shut-off valve 30 by conduit 37.

The arm of the 3-way valve is connected to a rod 38 which may or may not be controlled by a pedal. The conduit 37 is provided with a chamber 39 in which is situated a relief valve 40 of the spring-pressed ball type, the valve controlling communication between the conduit 37 and the atmosphere. The amount of pressure exerted on the ball by the spring may be adjusted by adjusting the backing member 41 of the spring.

It is readily seen from the above description that when the shut-off valve 30 is closed and the 3-way valve is moved to allow communication between conduits 37 and 35, the pressure in the power cylinder 5 will be permitted to decrease to a point where it will not open the valve 40. The setting of the relief valve is such as to maintain sufficient pressure in the power cylinder to prevent the vehicle from rolling on an incline when the vehicle is stopped. Thus the elements of the braking system are relieved of excessive strains from high pressures when such pressures are unnecessary. Also, with less pressure in the system, the brakes may be released more quickly.

In Figure 3 I have disclosed my invention applied to a power braking system which utilizes liquid pressure instead of air pressure. The 3-way control valve 34, the power cylinder 5, and its connection to the braking system, are the same as in Figure 2. The conduit 36, instead of leading to an air pressure tank, is connected to the liquid pressure tank 42 provided with a spring backed piston 43. Liquid is placed under pressure in the pressure tank 42 by means of a suitable gear pump 44 driven from some movable part of the vehicle. The suction side of the pump is in communication, by a conduit 45, with a sump tank 46 and the pressure side of the pump is in communication, by a conduit 47, with the pressure tank 42. The discharge conduit 37 for the discharge port of the 3-way valve communicates with the combined shut-off and relief valve 48 which is in communication with the sump tank by conduit 49. The combined shut-off and relief valve comprises a spring seated valve 50 having a valve stem 51 for permitting control of the valve by the lever 52 and the rod 53, the valve normally being held in open position. The rod 53 may be connected to the clutch pedal or to some other manually-controlled lever.

To apply the brakes, the 3-way valve 34 is moved to a position to place the pressure tank 42 in communication with the power cylinder 5. If it is now desired to prevent the release of the brakes without maintaining the power cylinder in communication with the pressure cylinder, the valve 50 is first permitted to close by proper actuation of rod 53 and then the 3-way valve is permitted to assume the position shown, thus placing the power cylinder in communication with the sump tank by way of the combined shut-off and relief valve. The amount of pressure retained in the power cylinder is determined by the pressure of the valve spring.

Although I have disclosed the shut-off valve as being separate from the control valve, it is to be understood that the two valves may be embodied within the same casing.

Having fully described my invention, what I claim as new and desire to secure by Letters Patent of the United States is:

1. In a motor vehicle provided with clutch mechanism and with braking apparatus, fluid-operated power means for actuating the brakes, a source of fluid pressure, a control valve for admitting fluid under pressure to the power means and exhausting it therefrom, an additional valve means communicating with the exhaust opening of the control valve for preventing the fluid under pressure from being exhausted from the power means notwithstanding the control valve is in an exhausting position, and means for controlling said additional means in response to a predetermined movement of an element of the clutch mechanism.

2. In a motor vehicle provided with a clutch mechanism and with braking apparatus, fluid-operated power means for actuating the brakes, a source of fluid pressure, control means for admitting fluid under pressure to the power means and exhausting it therefrom and comprising an application valve and an exhaust valve, a conduit leading from the exhaust valve to the atmosphere, a valve in said conduit, and means for closing said last named valve in response to a predetermined movement of an element of the clutch mechanism.

3. In a motor vehicle provided with a clutch and with braking apparatus, fluid-operated power means for actuating the brakes, a source of fluid pressure, a control valve for admitting fluid under pressure to the power means and exhausting it therefrom, and additional valve means including a pressure relief valve for preventing the fluid under pressure in the power means from being exhausted to a point below a predetermined pressure notwithstanding the control valve is in an exhausting position, said additional valve means being operable when the clutch is actuated.

4. In a motor vehicle provided with a clutch and with braking apparatus, fluid-operated power means for actuating the brakes, a source of fluid pressure, a control valve for admitting fluid under pressure to the power means and exhausting it therefrom, a shut-off valve in communication with the exhaust opening of the control valve, means for controlling the shut-off valve when the clutch is operated, and means comprising a relief valve in communication with the exhaust opening.

5. In a motor vehicle provided with a clutch and with braking apparatus, fluid-operated power means for actuating the brakes, a source of fluid pressure, control means for admitting fluid under pressure to the power means and exhausting it therefrom and comprising an application valve and an exhaust valve, a conduit leading from the exhaust valve to the atmosphere, a shut-off valve in said conduit, means for closing said shut-off valve in response to a predetermined movement of an element of the clutch mechanism, and means comprising a relief valve for providing communication between the conduit and the atmosphere when the shut-off valve is closed and the fluid pressure in the conduit is above a predetermined value.

WALTER R. FREEMAN.